US010302090B2

(12) United States Patent
Moormann et al.

(10) Patent No.: US 10,302,090 B2
(45) Date of Patent: May 28, 2019

(54) BILGE PUMP ARRANGEMENT HAVING BACK FLOW PREVENTER

(71) Applicant: Flow Control LLC., Beverly, MA (US)

(72) Inventors: Randall H. Moormann, Georgetown, MA (US); Todd R. Raabe, Duxbury, MA (US)

(73) Assignee: Flow Control LLC., Beverly, MA (US)

( * ) Notice: Subject to any disclaimer, the term of this patent is extended or adjusted under 35 U.S.C. 154(b) by 296 days.

(21) Appl. No.: 14/193,324

(22) Filed: Feb. 28, 2014

(65) Prior Publication Data

US 2015/0247504 A1  Sep. 3, 2015

(51) Int. Cl.
| | |
|---|---|
| *F04D 1/04* | (2006.01) |
| *F04D 15/00* | (2006.01) |
| *F04D 15/02* | (2006.01) |
| *F04D 29/42* | (2006.01) |
| *F16K 15/14* | (2006.01) |

(52) U.S. Cl.
CPC .......... *F04D 15/0227* (2013.01); *F04D 1/04* (2013.01); *F04D 15/0022* (2013.01); *F04D 29/4293* (2013.01); *F16K 15/147* (2013.01)

(58) Field of Classification Search
CPC .... F04D 1/04; F04D 15/0022; F04D 15/0227; F04D 29/4293; F16K 15/147; Y10T 137/788; Y10T 137/7885; Y10T 137/7881; Y10T 137/7882; Y10T 137/7883; Y10T 137/7884
See application file for complete search history.

(56) References Cited

U.S. PATENT DOCUMENTS

| | | | |
|---|---|---|---|
| 2,624,305 A | 1/1953 | Herrick et al. |
| 2,969,761 A | 1/1961 | Youtie |
| 3,174,434 A | 3/1965 | Schieve |
| 3,565,106 A | 2/1971 | Baumbach |
| 3,580,695 A | 5/1971 | Tumba |
| 4,524,805 A | 6/1985 | Hoffman |
| 4,881,873 A | 11/1989 | Smith et al. |
| 4,993,452 A | 2/1991 | Hough |
| 5,044,295 A | 9/1991 | Shimokawa |
| 5,346,369 A | 9/1994 | Miller, Jr. |
| 5,409,146 A | 4/1995 | Hazard et al. |

(Continued)

*Primary Examiner* — Philip E Stimpert
(74) *Attorney, Agent, or Firm* — Ware, Fressola, Maguire & Barber LLP

(57) ABSTRACT

Apparatus for providing liquid from a reservoir of liquid contained in a vehicle/vessel or other equipment, featuring a pump for pumping liquid having a pump housing outlet nozzle; and a back flow preventer assembly having an inlet end to couple to the outlet nozzle, having an outlet end to couple to an outlet hose for connecting to an outlet exiting a wall of a vehicle, vessel or other equipment, and having a duckbill-type check valve to provide liquid being pumped in one direction from the reservoir of the vehicle, vessel or other equipment to the outlet exiting the wall of the vehicle, vessel or other equipment via the outlet hose, and also configured to prevent residue liquid left in the outlet hose from flowing back into the pump and returning to the reservoir once the pump has completed pumping if the outlet exiting the wall of the vehicle, vessel or other equipment is above the outlet nozzle, so as to prevent on an on/off oscillation of the pump depending on the volume of residue liquid left in the outlet hose.

20 Claims, 4 Drawing Sheets

Exploded View of Pump With Back Flow Preventer

(56) References Cited

U.S. PATENT DOCUMENTS

| | | | |
|---|---|---|---|
| 5,592,966 A | | 1/1997 | Gates |
| 5,628,269 A | | 5/1997 | Henmi et al. |
| 5,860,799 A | | 1/1999 | Scheibe et al. |
| 6,089,260 A | | 7/2000 | Jaworski et al. |
| 6,148,860 A | * | 11/2000 | Sigler .................... B60R 15/04 137/844 |
| 6,149,036 A | | 11/2000 | Serio |
| 6,527,011 B1 | | 3/2003 | Mantz |
| 6,837,174 B1 | | 1/2005 | Baurley |
| 8,196,894 B2 | | 6/2012 | Spahr et al. |
| 2006/0091080 A1 | * | 5/2006 | Clukies .............. B01D 17/0202 210/691 |
| 2007/0157982 A1 | | 7/2007 | Dahm |
| 2008/0066815 A1 | | 3/2008 | Anderson |
| 2010/0028166 A1 | * | 2/2010 | Collins ............... F04D 15/0218 417/44.1 |
| 2010/0065136 A1 | * | 3/2010 | Stimpson ................ F04B 43/02 137/565.01 |
| 2010/0166570 A1 | * | 7/2010 | Hampton ............. F04B 49/065 417/36 |

\* cited by examiner

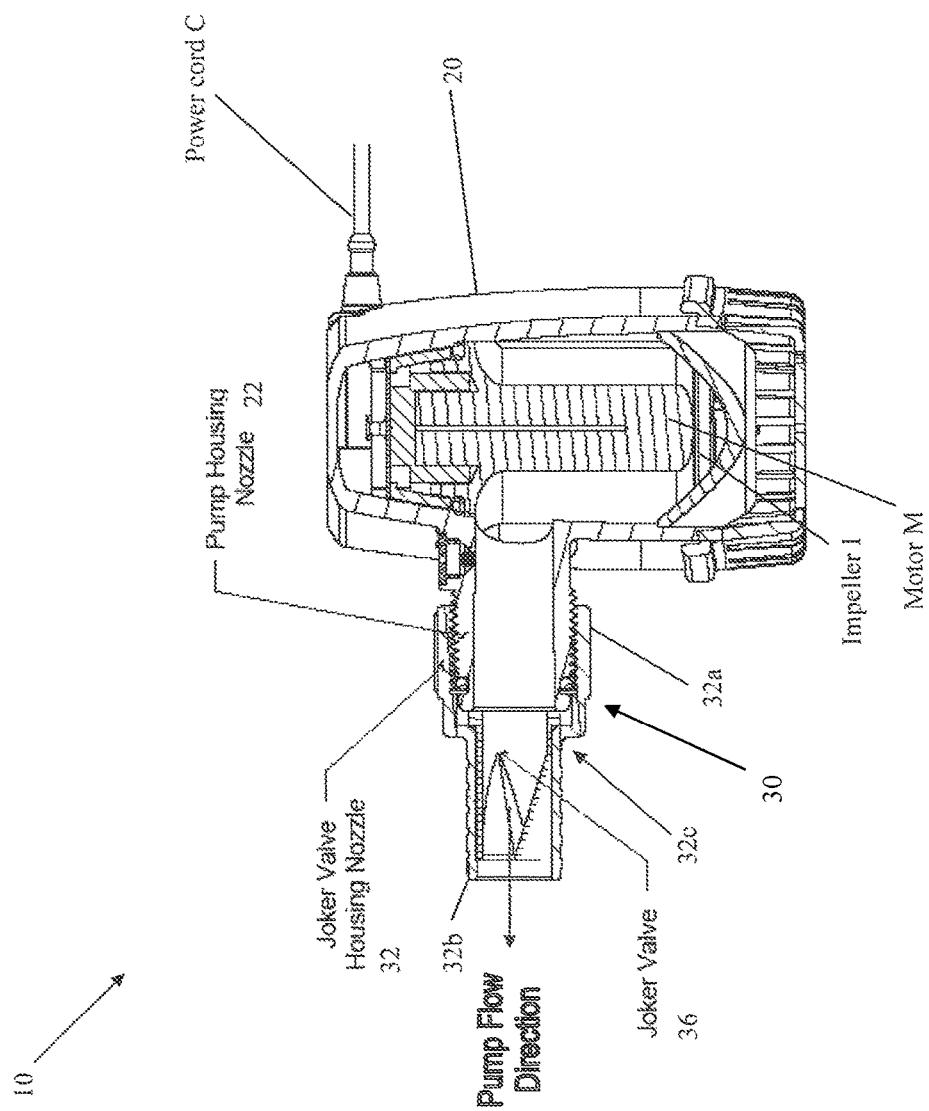
Figure 1: Pump With Back Flow Preventer Assembly

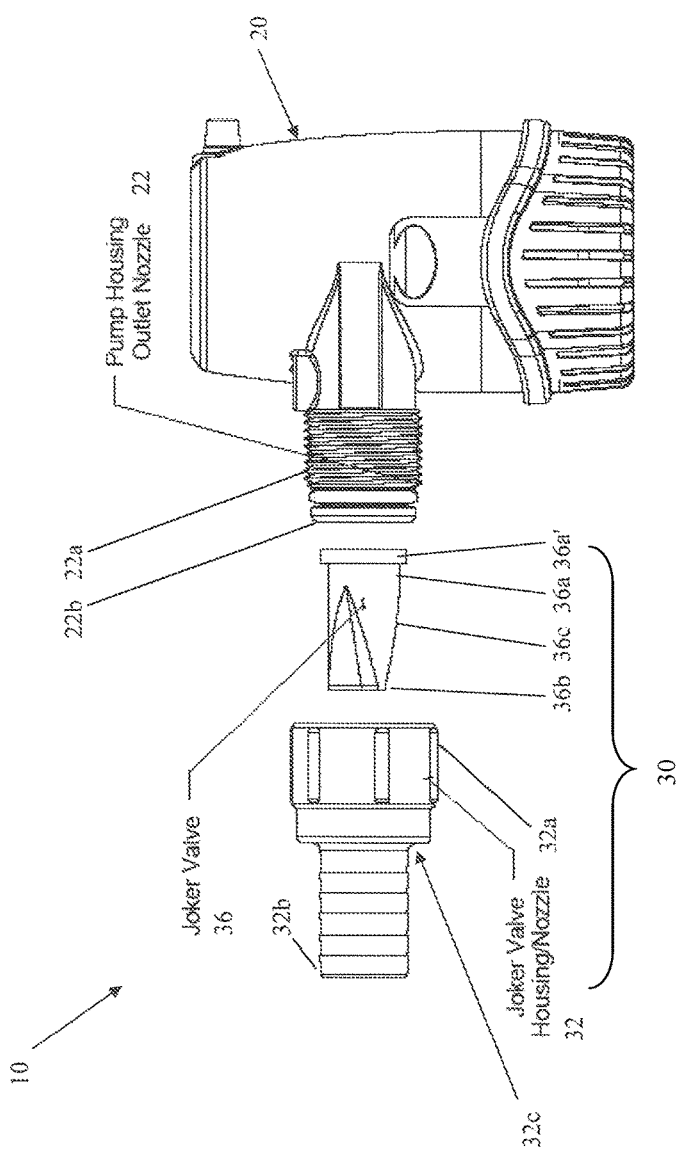
Figure 2: Exploded View of Pump With Back Flow Preventer

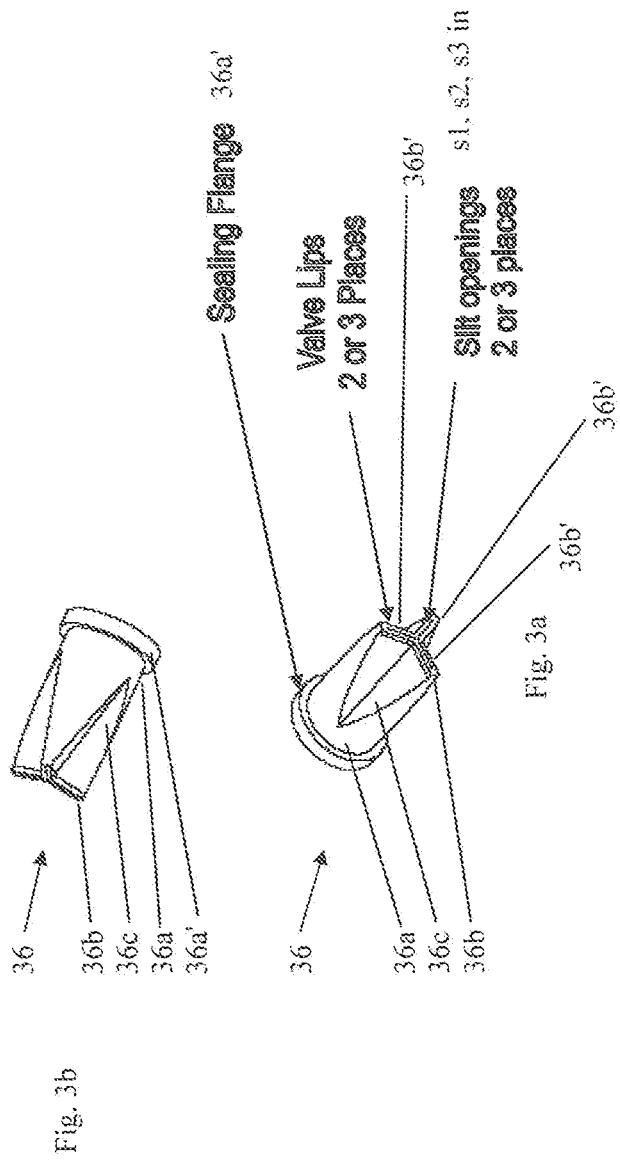

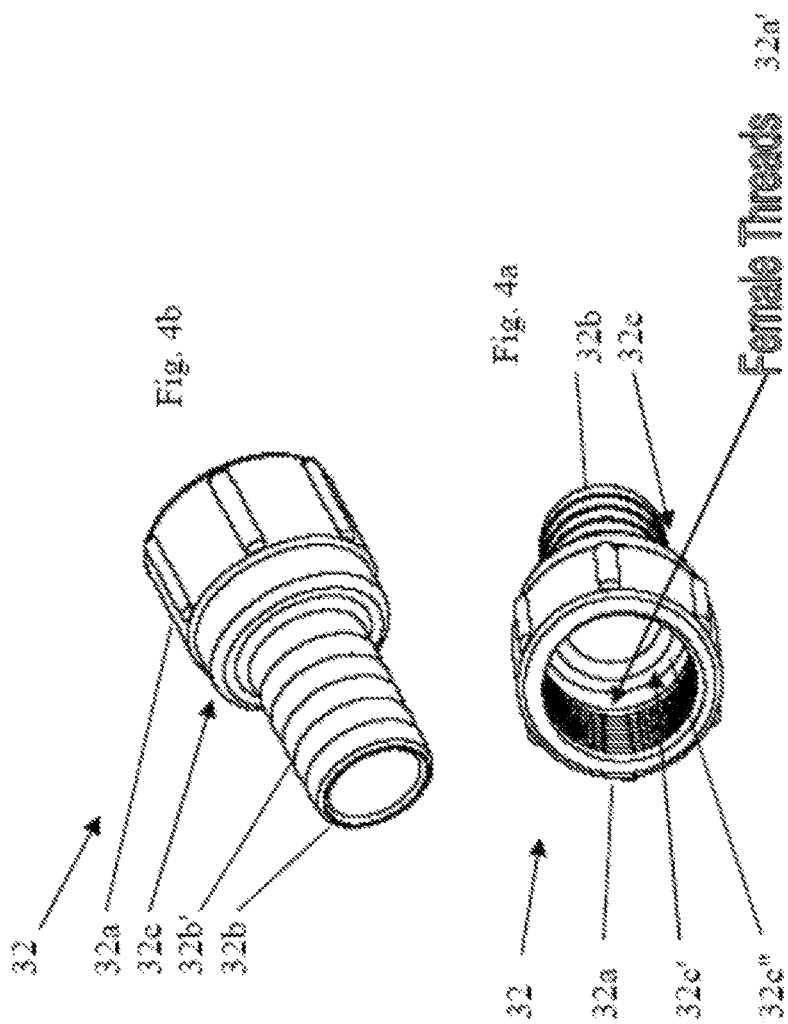

BILGE PUMP ARRANGEMENT HAVING BACK FLOW PREVENTER

By way of example, the present application is related to patent application Ser. No. 14/193,269 (911-17.31-1//M-RLE-X0007), filed on 28 Feb. 2014, which discloses a technique for solving an air lock problem, is assigned to the assignee of the present application, and is incorporated by reference in its entirety. See also related patent application Ser. No. 14/193,210 (911-17.30-1//M-RLE-X0006), filed on 28 Feb. 2014, which is assigned to the assignee of the present application, discloses a technique for solving the aforementioned air lock problem, and is incorporated by reference in its entirety. See also related patent application Ser. No. 13/917,970, (911-17.28-2//M-RLE-X0005), filed 14 Jun. 2013, which is assigned to the assignee of the present application, and is also incorporated by reference in its entirety.1

BACKGROUND OF THE INVENTION

1. Field of the Invention

This invention relates to a pump; and more particularly, relates to a centrifugal pump, e.g., being used as a bilge pump.

2. Description of Related Art

In a boat's bilge, once a centrifugal bilge pump has completed pumping and turns off, if the outlet exiting the side of the boat is, as it is normally, above the pump's outlet, the residue water left in the outlet hose will return to the bilge, and, depending upon the volume of water, may turn the pump back on, creating an "on/off" oscillation problem, e.g., which will likely burn out the bilge pump. There is a need in the art for a solution to this "on/off" oscillation problem.

SUMMARY OF THE INVENTION

In general, the present invention provides a new and unique back flow preventer assembly that solves the aforementioned problem in the art, e.g., by preventing the water within the outlet hose from returning back to the bilge, e.g., when the pump turns off.

In particular, and by way of example, the present invention may take the form of apparatus for providing liquid from a reservoir of liquid contained in a vehicle, vessel or other equipment, featuring a pump in combination with a back flow preventer assembly.

The pump may be configured to respond to a level of liquid contained in a reservoir in a vehicle, vessel or other equipment, and turn on/off for pumping the liquid based on the level of the liquid sensed. The pump may also be configured with a pump housing outlet nozzle for providing the liquid being pumped.

The back flow preventer assembly may include, or take the form of, the following:

an inlet configured to couple to the pump housing outlet nozzle, an outlet configured to couple to an outlet hose for connecting to an outlet exiting a wall of the vehicle, vessel or other equipment, and a duckbill-type check valve having at least one duckbill lip configured to open and provide the liquid being pumped by the pump in one direction from the reservoir of the vehicle, vessel or other equipment to the outlet exiting the wall of the vehicle, vessel or other equipment via the outlet hose, and also configured to close and prevent residue liquid left in the outlet hose from flowing back into the pump and returning to the reservoir once the pump has completed pumping and turns off if the outlet exiting the wall of the vehicle, vessel or other equipment is above the outlet nozzle, so as to prevent on an on/off oscillation of the pump depending on the volume of residue liquid left in the outlet hose.

According to some embodiments, the present invention may include one or more of the following features:

The at least one duckbill lip may include at least two duckbill lips so as to form a duckbill check valve.

The at least one duckbill lip may include at least three duckbill lips so as to form a joker check valve.

The pump housing outlet nozzle may be configured with threads, and the inlet of the back flow preventer assembly may be configured with corresponding threads for receiving the threads of the pump housing outlet nozzle.

The outlet of the back flow preventer assembly may be configured with one or more serrations for engaging one end of the outlet hose.

The inlet of the duckbill-type check valve may be configured with a flange for engaging part of the pump housing outlet nozzle to be retained in the back flow preventer assembly when the back flow preventer assembly is coupled to the pump housing outlet nozzle.

The apparatus may include, or form part of, an assembly or arrangement having a bilge pump, a septic pump or a potable water pump.

The duckbill-type check valve may be configured to be easily replaceable by decoupling the back flow preventer assembly from the pump housing outlet nozzle.

According to some embodiments, the present invention may take the form of a bilge pump arrangement for providing liquid from a bilge of a boat, featuring the aforementioned pump in combination with the aforementioned back flow preventer assembly.

BRIEF DESCRIPTION OF THE DRAWING

The drawing, which is not necessarily to scale, include the following Figures:

FIG. 1 is a diagram of a ¾ sectional view of a pump having a back flow preventer assembly, according to some embodiments of the present invention.

FIG. 2 is a diagram of an exploded side view of the pump shown in FIG. 1.

FIG. 3 includes FIGS. 3a and 3b showing diagrams of perspective views of a joker or duckbill valve that forms part of the back flow preventer assembly shown in FIG. 1, according to some embodiments of the present invention.

FIG. 4 includes FIGS. 4a and 4b showing diagrams of perspective views of a joker or duckbill valve housing/nozzle that forms part of the back flow preventer assembly shown in FIG. 1, according to some embodiments of the present invention.

In the following description of the exemplary embodiment, reference is made to the accompanying drawing, which form a part hereof, and in which is shown by way of illustration of an embodiment in which the invention may be practiced. It is to be understood that other embodiments may be utilized, as structural and operational changes may be made without departing from the scope of the present invention.

DETAILED DESCRIPTION OF THE INVENTION

By way of example, FIGS. 1-2 show apparatus generally indicated as 10, e.g., for providing liquid from a reservoir of liquid contained in a vehicle, vessel or other equipment, featuring a pump 20 in combination with a back flow preventer assembly generally indicated as 30.

The pump 20 may be configured to respond to a level of liquid contained in the reservoir in the vehicle, vessel or other equipment, and turn on/off for pumping the liquid based on the level of the liquid sensed. The pump 20 may be configured with a pump housing outlet nozzle 22 for providing the liquid being pumped, consistent with that set forth below. By way of example, the pump 20 may take the form of a bilge pump to be arranged in the bilge of a vessel or boat for pumping water out of the bilge of the vessel or boat.

The back flow preventer assembly 30 includes a valve housing or nozzle 32 having an inlet 32a configured to couple to the pump housing outlet nozzle 22, having an outlet 32b configured to couple to an outlet hose (not shown) for connecting to an outlet exiting a wall of the vehicle, vessel or other equipment, and having an intermediate portion 32c configured with an internal cavity 32c' formed therein.

The back flow preventer assembly 30 also has a duckbill-type check valve 36 arranged in the cavity 32c' of the intermediate portion 32c. The duckbill-type check valve 36 has a corresponding inlet 36a positioned at the inlet 32a of the nozzle 32. The inlet 36a has an opening 36a' configured to receive liquid provided from the pump housing outlet nozzle 22. The duckbill-type check valve 36 has a corresponding outlet 36b positioned at the outlet 32b of the nozzle 32. The outlet 36b is configured with at least one duckbill lip 36b' having a corresponding slit opening s1 (see FIG. 3).

In operation, the at least one duckbill lip 36b' is configured to open and provide the liquid being pumped by the pump 20 in one direction from the reservoir of the vehicle, vessel or other equipment to the outlet exiting the wall of the vehicle, vessel or other equipment via the outlet hose, and also configured to close and prevent residue liquid left in the outlet hose from flowing back into the pump 20 and returning to the reservoir once the pump 20 has completed pumping and turns off if the outlet exiting the wall of the vehicle, vessel or other equipment is above the outlet nozzle, so as to prevent on an on/off oscillation of the pump 20 depending on the volume of residue liquid left in the outlet hose.

The duckbill-type check valve 36 may include intermediate portions 36c configured and tapered to form the at least one duckbill lip 36b', consistent with that shown in FIG. 3. For example, the intermediate portions 36c may be configured and tapered inwardly in three symmetrical V-like configurations to form a three valve lip design in the form of a so-called joker valve, including three lips 36b' having three corresponding slit openings s1, s2 and s3 for providing the liquid being pumped, e.g., consistent with that shown in FIG. 3. Alternatively, embodiments are also envisioned, and the scope of the invention is intended to include, the at least one duckbill lip 36b' taking the form of a two valve lip design, as well as valve lip designs having more than three lips. The scope of the invention is not intended to be limited to the number of lips forming part of the duckbill-type check valve 36.

The corresponding inlet 36a of the duckbill-type check valve 36 may also be configured with a sealing flange or seat 36a for providing a suitable liquid seal when the inlet 32a of the nozzle 32 is coupled to the pump housing outlet nozzle 22, consistent with that shown in FIGS. 1 and 2.

In effect, the duckbill-type check valve 36 is a one way valve allowing water to pass in one direction only. The nozzle 32 is configured to contain, seal and control the function of the duckbill-type check valve 36. Moreover, the back flow preventer assembly 30 is designed to allow for easy serviceability and replacement of the duckbill-type check valve 36, based at least partly on the fact that debris can, and will likely, buildup internally over time, degrading its overall ability to function. For example, the nozzle 32 may be unscrewed from the pump housing outlet nozzle 22, the old duckbill-type check valve 36 easily replaced with a new duckbill-type check valve, and the nozzle 32 may then be screwed back on the pump housing outlet nozzle 22.

According to some embodiments of the present invention, the duckbill-type check valve 36 may be made of, e.g., a 60 durometer shore A elastomeric material. The duckbill-type check valve 36 may take the form of the so-called "Joker Valve" with the 3 lip design, or the so-called "Duck Bill" valve with a 2 lip design. Both designs work well because of the compliant nature of the elastomeric material and the "slit" in the outlet 36b that opens due to the force of the "outgoing water" and closes due the molded geometry and the force of the water, e.g., by gravity in this case, preventing the return of the water back to the pump 20.

The inlet 32a of the nozzle 32 may be configured with suitable threads 32a', e.g., which may take the form of female threads as shown in FIG. 4a. The pump housing outlet nozzle 22 may be configured with corresponding threads 22a, e.g., which may take the form of male threads as shown in FIGS. 1-2. The outlet 32b of the nozzle 32 may be configured with one or more serrations 32b', e.g., as shown in FIGS. 4a and 4b, for receiving and engaging suitable hosing (not shown). In effect, a number of radial angular serrations may be configured to allow for the attachment of the outlet hose on the outlet 32b of the housing/nozzle 32.

The valve housing or nozzle 32 may be configured and dimensioned with an inside diameter, e.g., so that the valve housing or nozzle 32 will snugly contain the duckbill-type check valve 36 in its operating position. The valve housing or nozzle 32 may be configured with the seat or step 32c", so one side of the integral seal 36a' of the "Joker Valve" 36 can seal against, as best shown in FIGS. 1 and 4a. The valve housing or nozzle 32 may be configured with the threads 32a' for easily detaching the nozzle 32 from the outlet nozzle 22 allowing the cleaning or replacing the "Joker Valve" 36, as shown. Embodiments are envisioned, and the scope of the invention is intended to include, using other means of coupling the valve housing or nozzle 32 to the pump housing outlet nozzle 22, e.g., including using various quick disconnect means. The valve housing or nozzle 32 may be made from a material that can vary depending upon the nature of use and the particular environment of the application.

By way of example, the pump housing outlet nozzle 22 may be configured as an integral part of the pump 20, as shown, and configured with the mating male threads 22a to accept the female threads 32a' of housing/nozzle 32 allowing a secure fitting and coupling. The pump housing outlet nozzle 22 may be configured, as well, with a corresponding step seat 22b, e.g., to seal against the other side of the integral seal 36a' on the duckbill-type check valve 36.

The pump 10, like that shown in FIG. 1, may also include, e.g., other parts, elements, components, or circuits that do not form part of the underlying invention, including an impeller, a motor, diaphragm pumping components, pressure transducers, wiring for coupling the motor to a control circuit, and are thus not identified and described in detail herein.

Moreover, pumps having motors and impeller arranged or configured thereon are known in the art, and the scope of the invention is not intended to be limited to any particular type or kind thereof either now known or later developed in the future. In addition, pumps configured to respond to a level of liquid contained in a reservoir in a vehicle, vessel or other equipment, and turn on/off automatically for pumping the liquid based on the level of the liquid sensed, are also known in the art, and the scope of the invention is not intended to be limited to any particular type or kind thereof either now known or later developed in the future.

POSSIBLE APPLICATIONS

Possible applications are envisioned to include any type or kind of pump or rotary equipment, including but not limited to centrifugal pumps or other types or kinds of submersible pumps either now known or later developed in the future, including bilge pumps or utility pumps.

SCOPE OF THE INVENTION

Although described in the context of particular embodiments, it will be apparent to those skilled in the art that a number of modifications and various changes to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above.

We claim:

1. Apparatus for providing liquid from a reservoir, comprising:
    a liquid level sensing pump configured to respond to a level of the liquid contained in the reservoir, and turn on/off for pumping the liquid contained in the reservoir based on the level of the liquid sensed, and also configured with a pump housing outlet nozzle for providing the liquid being pumped from the reservoir; and
    a back flow preventer assembly configured with
        a valve housing or nozzle having
            a valve housing or nozzle inlet configured to couple to the pump housing outlet nozzle and comprising an exterior surface having a plurality of longitudinal projections,
            a valve housing or nozzle outlet configured with at least one serration to attach an outlet hose on the valve housing or nozzle outlet, and
            a valve housing or nozzle intermediate portion configured with an internal cavity formed therein, and
        a duckbill-type check valve with at least one duckbill lip arranged in the internal cavity of the valve housing or nozzle intermediate portion,
        the duckbill-type check valve configured to open and provide the liquid being pumped by the liquid level sensing pump in one direction from the reservoir via the outlet hose, and also configured to close and prevent residue liquid left in the outlet hose from flowing back into the liquid level sensing pump and returning to the reservoir once the liquid level sensing pump has completed pumping and turns off to prevent on an on/off oscillation of the liquid level sensing pump;
    wherein the duckbill-type check valve is configured to be replaceable by decoupling the back flow preventer assembly from the pump housing outlet nozzle, and
    wherein the valve housing or nozzle is configured such that the valve housing or nozzle inlet, the valve housing or nozzle outlet and the valve housing or nozzle intermediate portion remain affixed together when the back flow preventer assembly is decoupled from the pump housing outlet nozzle.

2. Apparatus according to claim 1, wherein the at least one duckbill lip comprises two duckbill lips so as to form a duckbill check valve.

3. Apparatus according to claim 1, wherein the at least one duckbill lip comprises at least three duckbill lips so as to form a joker check valve.

4. Apparatus according to claim 1, wherein the pump housing outlet nozzle is configured with threads, and the valve housing or nozzle inlet of the back flow preventer assembly is configured with corresponding threads for receiving the threads of the pump housing outlet nozzle.

5. Apparatus according to claim 4, wherein
    an inlet of the duckbill-type check valve comprises a sealing flange configured to provide a liquid seal when the valve housing or nozzle inlet is coupled to the pump housing outlet nozzle; and
    wherein the valve housing or nozzle inlet comprises an unthreaded section comprising a seat or step configured to seal against a first side of the sealing flange and configured to house a further seat or step of the pump housing outlet nozzle configured to seal against a second side of the sealing flange.

6. Apparatus according to claim 5, wherein the further seat or step of the pump housing outlet nozzle is arranged on an unthreaded section of the pump housing outlet nozzle.

7. Apparatus according to claim 1, wherein the at least one serration of the valve housing or nozzle outlet comprises a plurality of radial, angular serrations configured to allow for the attachment of the outlet hose on the valve housing or nozzle outlet.

8. Apparatus according to claim 1, wherein an inlet portion of the duckbill-type check valve is configured with a flange for engaging part of the pump housing outlet nozzle to be retained in the back flow preventer assembly when the back flow preventer assembly is coupled to the pump housing outlet nozzle.

9. Apparatus according to claim 1, wherein the plurality of longitudinal projections are configured to aid in coupling and decoupling the valve housing or nozzle to and from the pump housing outlet nozzle.

10. The apparatus according to claim 1, wherein the duckbill-type check valve arranged in the internal cavity of the valve housing or nozzle intermediate portion comprises:
    an inlet positioned at the valve housing or nozzle inlet configured to receive liquid from the liquid level sensing pump, and
    an outlet positioned at the valve housing or nozzle outlet.

11. The apparatus according to claim 1, wherein an inlet of the duckbill-type check valve comprises a sealing flange configured to provide a liquid seal when the valve housing or nozzle inlet is coupled to the pump housing outlet nozzle;
    wherein the valve housing or nozzle comprises a seat or step configured to seal against a first side of the sealing flange; and
    wherein the pump housing outlet nozzle comprises a further seat or step configured to seal against a second side of the sealing flange.

12. A bilge pump arrangement for providing liquid from a bilge of a boat, comprising:
    an outlet hose configured to connect to an outlet exiting a side of the boat;
    a liquid level sensing bilge pump configured to respond to a level of the liquid contained in the bilge of the boat, and turn on/off for pumping the liquid contained in the bilge based on the level of the liquid sensed, and also configured with a pump housing outlet nozzle for providing the liquid being pumped from the bilge; and a back flow preventer assembly configured with
   a valve housing or nozzle having
      a valve housing or nozzle inlet configured to couple the valve housing or nozzle as a separate component to the pump housing outlet nozzle and comprising an exterior surface having a plurality of longitudinal projections,
      a valve housing or nozzle outlet configured with at least one serration to attach the outlet hose on the valve housing or nozzle outlet for connecting to the outlet exiting the side of the boat, and
      a valve housing or nozzle intermediate portion configured with an internal cavity formed therein, and
   a duckbill-type check valve having at least one duckbill lip arranged in the internal cavity of the valve housing or nozzle intermediate portion,
the at least one duckbill lip of the duckbill-type check valve configured to open and provide liquid being pumped by the liquid level sensing bilge pump in one direction from the bilge of the boat to the outlet exiting the side of the boat via the outlet hose, and also configured to close and prevent residue liquid left in the outlet hose from flowing back into the liquid level sensing bilge pump and returning to the bilge once the liquid level sensing bilge pump has completed pumping and turns off if the outlet exiting the side of the boat is above the outlet nozzle, so as to prevent on an on/off oscillation of the liquid level sensing bilge pump depending on the volume of residue liquid left in the outlet hose;
wherein the duckbill-type check valve is configured to be replaceable by decoupling the back flow preventer assembly from the pump housing outlet nozzle, and
wherein the valve housing or nozzle is configured such that the valve housing or nozzle inlet, the valve housing or nozzle outlet and the valve housing or nozzle intermediate portion remain affixed together when the back flow preventer assembly is decoupled from the pump housing outlet nozzle.

13. A bilge pump arrangement according to claim 12, wherein the at least one duckbill lip comprises at least three lips so as to form a joker check valve.

14. A bilge pump arrangement according to claim 12, wherein the pump housing outlet nozzle is configured with threads, and the valve housing or nozzle inlet of the back flow preventer assembly is configured with corresponding threads for receiving the threads of the pump housing outlet nozzle.

15. A bilge pump arrangement according to claim 12, wherein the at least one serration of the valve housing or nozzle outlet comprises a plurality of radial, angular serrations configured to allow for the attachment of the outlet hose on the valve housing or nozzle outlet.

16. A bilge pump arrangement according to claim 12, wherein an inlet portion of the duckbill-type check valve is configured with a flange for engaging part of the pump housing outlet nozzle to be retained in the back flow preventer assembly when the back flow preventer assembly is coupled to the pump housing outlet nozzle.

17. A bilge pump arrangement according to claim 12, wherein the plurality of longitudinal projections are configured to aid in coupling and decoupling the valve housing or nozzle to and from the pump housing outlet nozzle.

18. A back flow preventer assembly for use with a bilge pump configured to pump a liquid from a reservoir, comprising:
   a valve housing or nozzle comprising:
      a valve housing or nozzle inlet configured to couple the valve housing or nozzle to the bilge pump and comprising an exterior surface having a plurality of longitudinal projections,
      a valve housing or nozzle outlet configured with at least one serration to attach an outlet hose on the valve housing or nozzle outlet, and
      a valve housing or nozzle intermediate portion configured with an internal cavity formed therein, and
   a duckbill-type check valve with at least one duckbill lip arranged in the internal cavity of the valve housing or nozzle intermediate portion,
the duckbill-type check valve configured to open and provide the liquid being pumped by the bilge pump in one direction from the reservoir comprising the liquid, and also configured to close and prevent residue liquid left in the outlet hose from flowing back into the bilge pump and returning to the reservoir once the bilge pump has completed pumping and turns off;
wherein the duckbill-type check valve is configured to be replaceable by decoupling the back flow preventer assembly from the bilge pump, and
wherein the valve housing or nozzle is configured such that the valve housing or nozzle inlet, the valve housing or nozzle outlet and the valve housing or nozzle intermediate portion remain affixed together when the back flow preventer assembly is decoupled from the bilge pump.

19. The back flow preventer assembly according to claim 18, wherein the at least one serration of the valve housing or nozzle outlet comprises a plurality of radial, angular serrations configured to allow for the attachment of the outlet hose on the valve housing or nozzle outlet.

20. The back flow preventer assembly according to claim 19, wherein the plurality of radial, angular serrations are arranged on an outer surface of the valve housing or nozzle outlet.

* * * * *